Jan. 1, 1946.   R. E. HERSEY   2,392,089
SWITCHING SYSTEM
Filed June 23, 1944    20 Sheets-Sheet 1

FIG. 1

| FIG. 7 | FIG. 8 | FIG. 9 | FIG. 10 |
|---|---|---|---|
| FIG. 11 | FIG. 12 | FIG. 13 | FIG. 14 |
| FIG. 15 | //// | FIG. 16 | FIG. 17 | FIG. 18 |
| FIG. 19 | FIG. 20 | FIG. 21 | FIG. 22 | FIG. 23 |

FIG. 2

| FIG. 5 |
| FIG. 6 |

FIG. 3

| 7 PRIMARY SWITCHES 0-INT-9 DIST. FR. 9 AND INT. | 8 SECONDARY SWITCHES 0-INT-9 DIST. FR. 9 AND INT. | 9 PRIMARY SWITCHES 0-INT-9 OFFICE FR. 9 AND INT. | 10 SECONDARY SWITCHES 0-INT-9 OFFICE FR. 9 AND INT. |
|---|---|---|---|
| 11 PRIMARY SWITCHES 0-INT-9 DIST. FR. 0 | 12 SECONDARY SWITCHES 0-INT-9 DIST. FR. 0 | 13 PRIMARY SWITCHES 0-INT-9 OFFICE FR. 0 | 14 SECONDARY SWITCHES 0-INT-9 OFFICE FR. 0 |
| 15 SENDER LINK CIRCUITS SENDER MARKER CONNECTOR SENDER FRAME REGISTER | 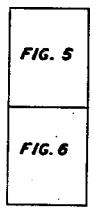 | 16 TRUNK CONNECTOR NO. 1 | 17 TRUNK CONNECTOR NO. 2 | 18 TRUNK CONNECTOR NO. 3 |
| 19 DISTRICT FRAME IDENTIFICATION DISTRICT PREFERENCE CCT. | 20 ROUTE RELAYS OFFICE PREFERENCE CCT. | 21 OFFICE FRAME IDENTIFICATION TRUNK GROUP SELECTOR | 22 OFFICE FRAME IDENTIFICATION TRUNK GROUP SELECTOR | 23 OFFICE FRAME IDENTIFICATION TRUNK GROUP SELECTOR |

FIG. 4

| 5 SWITCHING TRAIN & DECODERS |
| 6 SENDER LINK SWITCHES & SENDERS |

INVENTOR
R. E. HERSEY
BY
John A. Hall
ATTORNEY

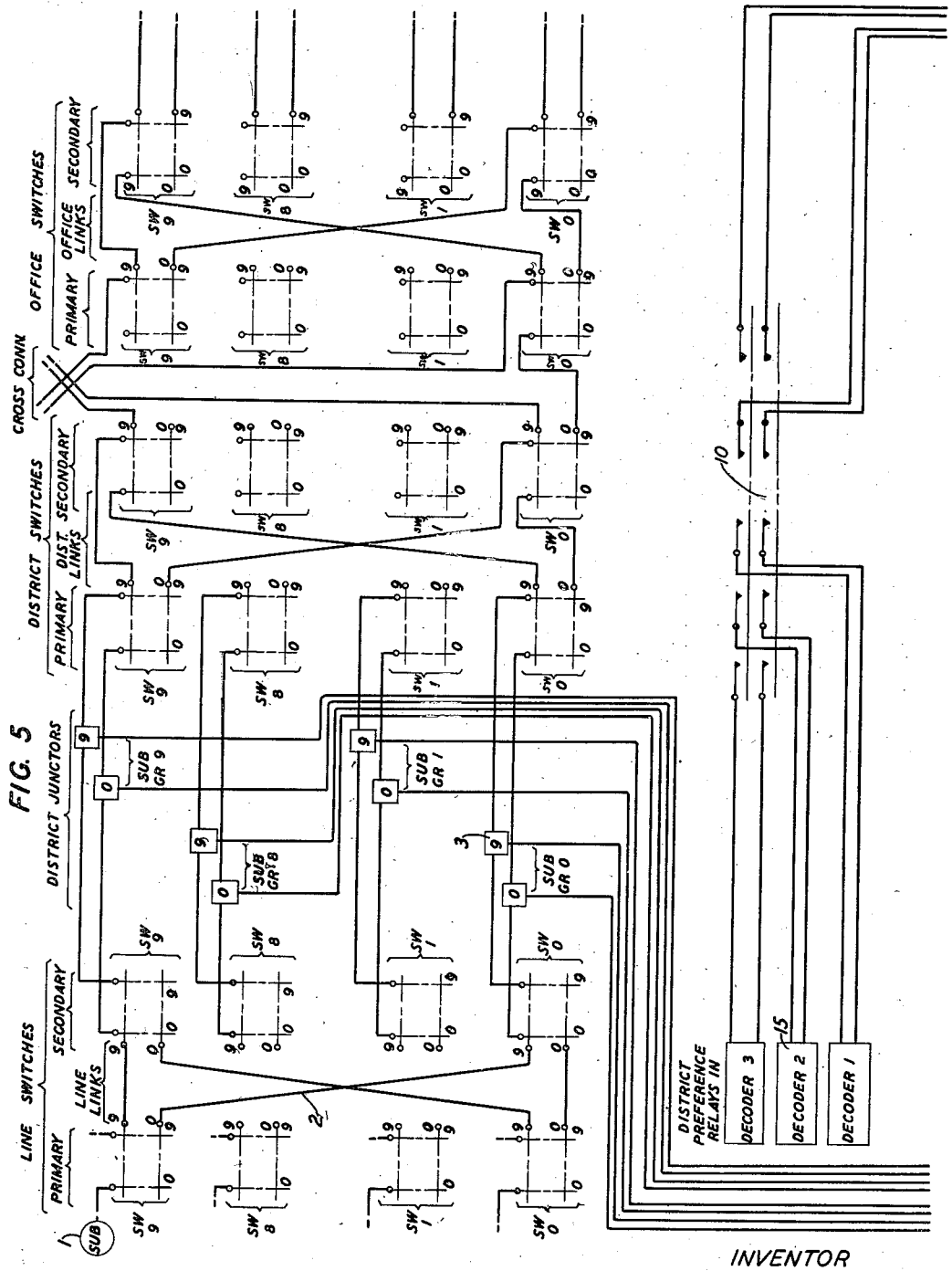

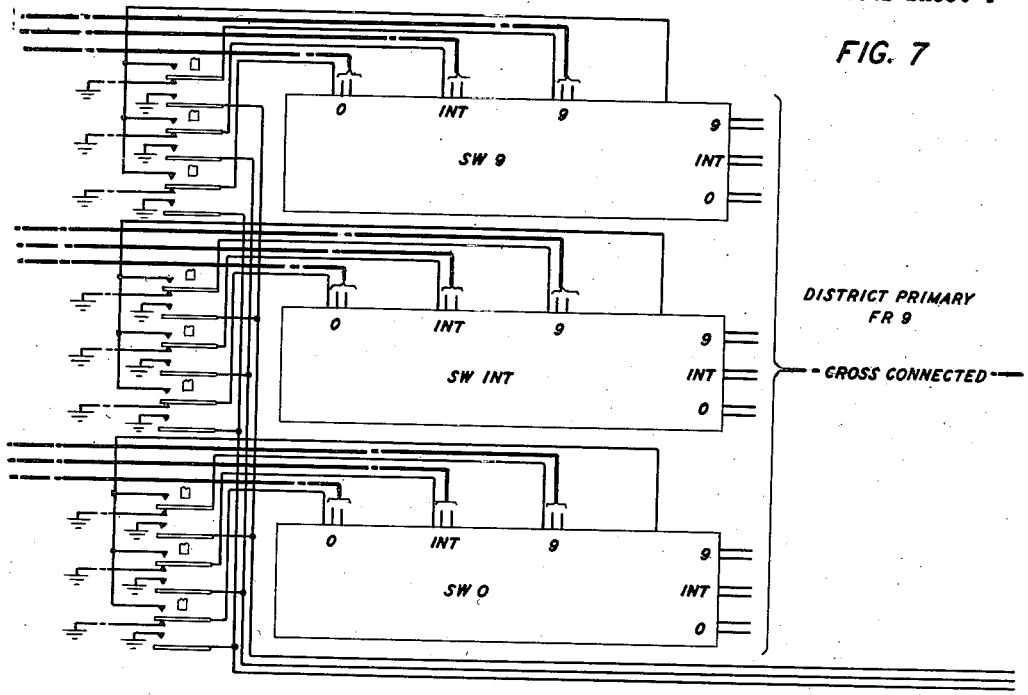
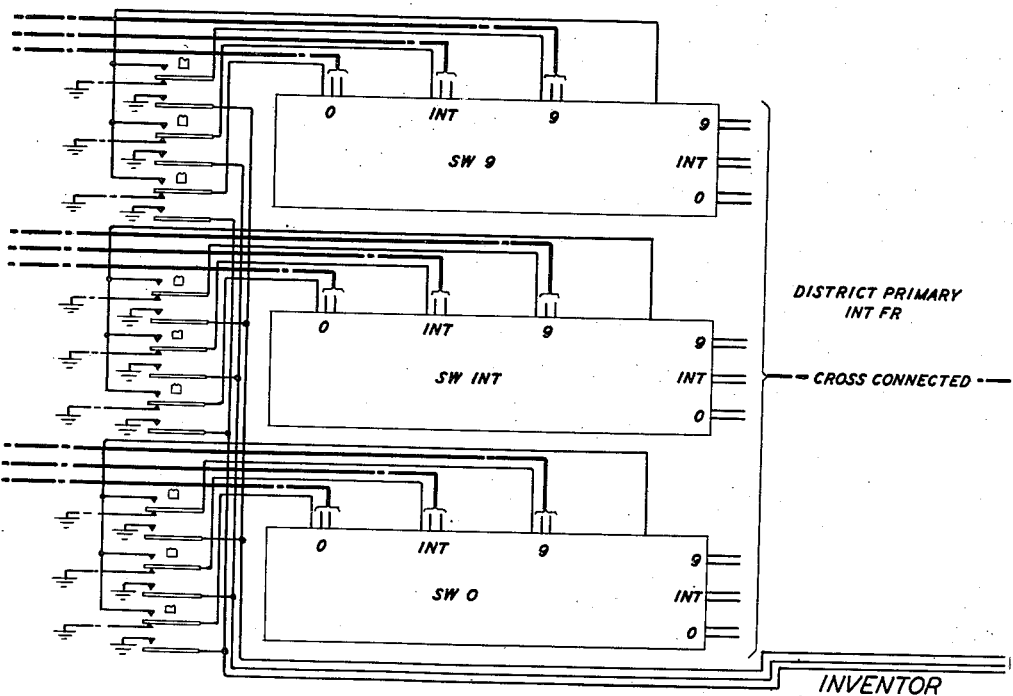

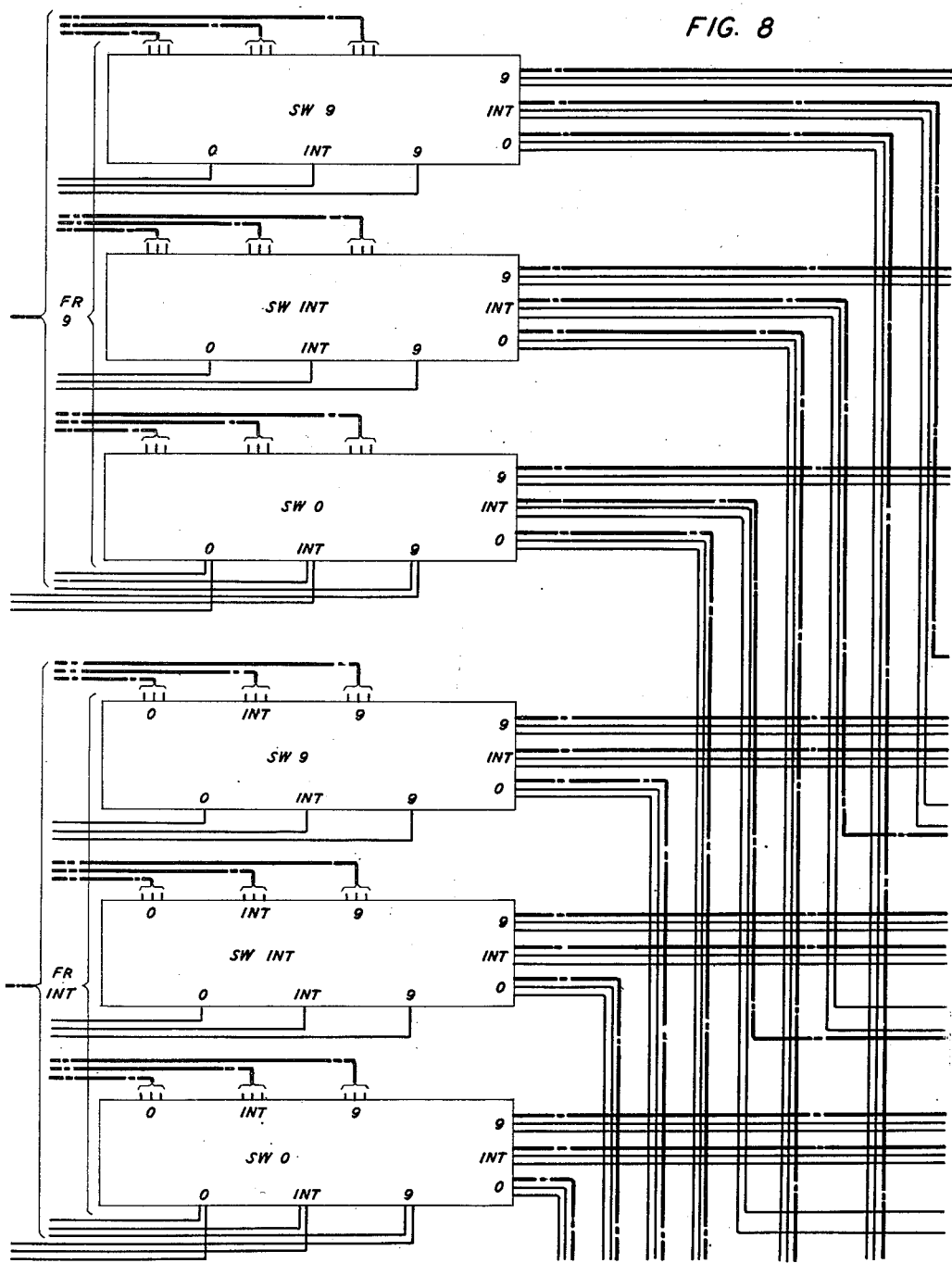

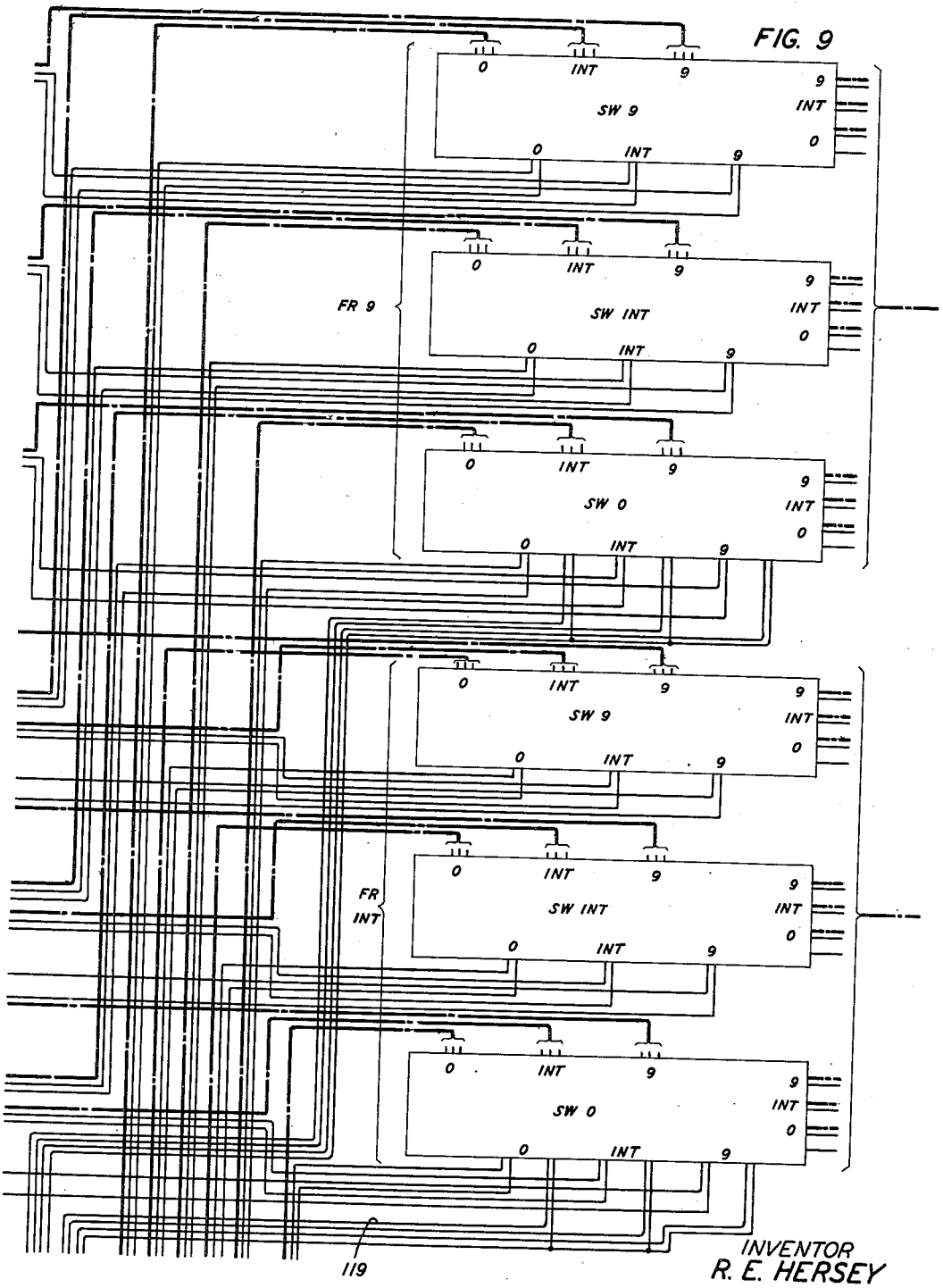

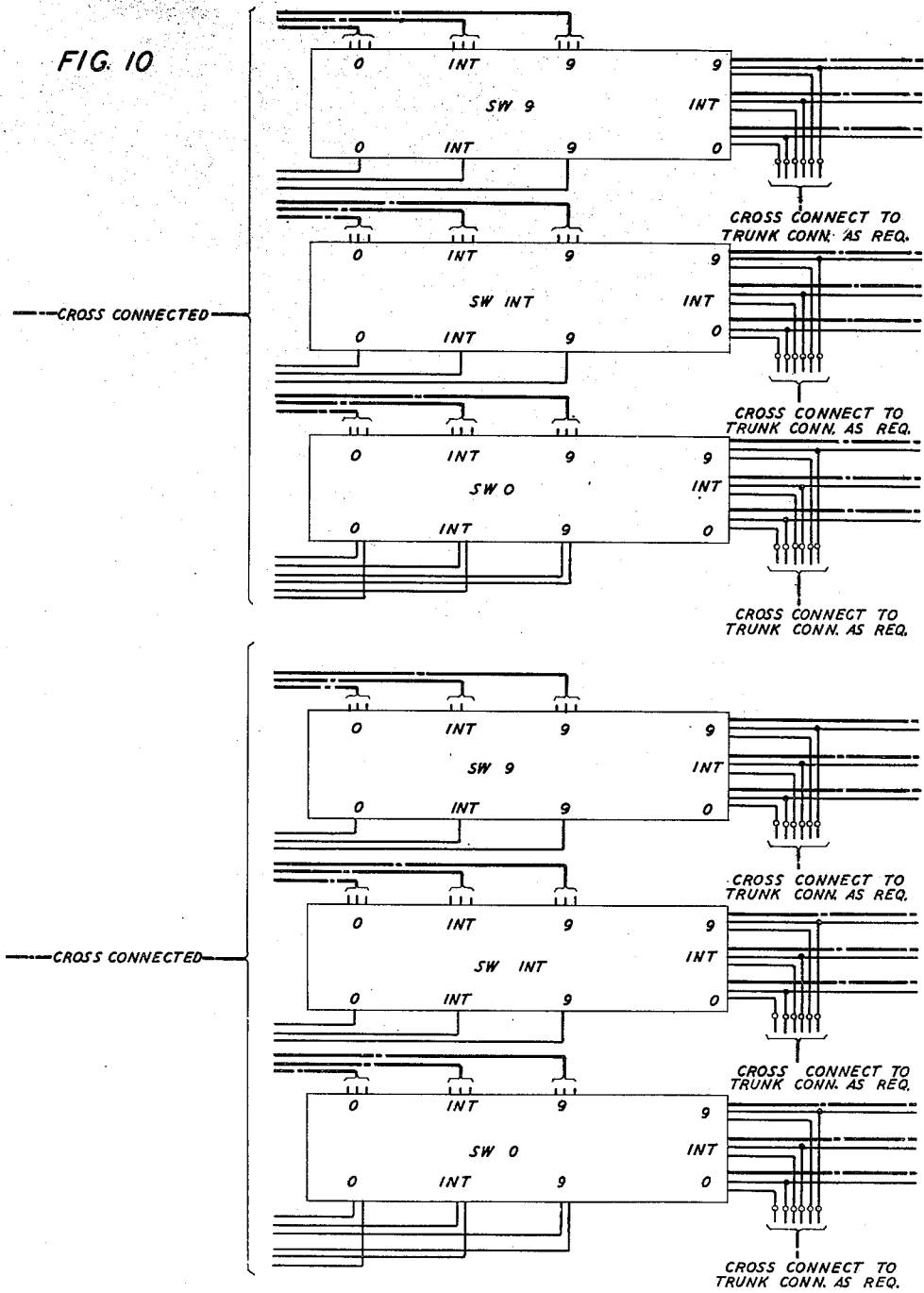

Jan. 1, 1946.   R. E. HERSEY   2,392,089
SWITCHING SYSTEM
Filed June 23, 1944   20 Sheets-Sheet 10

INVENTOR
R. E. HERSEY
BY
John Marshall
ATTORNEY

Patented Jan. 1, 1946

2,392,089

UNITED STATES PATENT OFFICE 2,392,089

SWITCHING SYSTEM

Ralph E. Hersey, Madison, N. J., assignor to Bell Telephone Laboratories, Incorporated, New York, N. Y., a corporation of New York Application June 23, 1944, Serial No. 541,764

8 Claims. (Cl. 179—22)

This invention relates to communication systems and particularly to machine switching systems for telephonic communication.

The object of the invention is to simplify the cross bar system and to provide a more economical arrangement by replacing certain marker operations by automatic operations.

One of the important advantages of the cross bar system is its great economy due to the fact that only the switch structures called for by the digital designations employed need be supplied. This is made possible through the marker system of operating the switches whereby paths may be marked out and only switches for the paths which will be used need be installed. Apparatus for other paths that are possible through other combinations of digits need not be installed until there is actual need for their use. One example of this very flexible arrangement is the establishment of a serial connection through four switch structures known as the district frame primary and secondary switches and the office frame primary and secondary switches. By this arrangement any desired number of trunk groups may be approached from any given number of incoming circuits known as district junctors and only the switching means necessary for the interconnection of these circuits need be supplied, provision for future expansion being made only as such expansion appears.

The marker, however, is a complicated and expensive circuit device and hence anything which will contribute to its simplicity is to be considered as a step forward in the art. In accordance with the present invention the marker is relieved of its duty of selecting each of the different components of a path from a given district junctor through the four switches involved in the district and office frames to a given trunk in a selected group, and an automatic operation is substituted therefor. As before a subscriber's sender is employed to register the number of the called subscriber's telephone and as before a route relay will be operated as soon as the calling subscriber has completed the dialing of the office code. According to the present invention, however, the operation of the route relay instead of being translated into a complicated marker operation involving the selection of the various links, now merely causes the automatic selection of an idle trunk in the associated group.

In accordance with the present invention there are three group relays, one of which in each group is automatically operated to set up a circuit which automatically indicates the preferred path between the line from the district junctor to the idle trunk in the selected group. This circuit is in the form of a connection through three distributing points, each controlled by one of said relays. Each relay controls a plurality of circuits, connecting a plurality of incoming circuits to a plurality of outgoing circuits so that if there are a plurality of idle trunks in the selected group a plurality of paths will be established through the operation of a selected three of said relays. The first of these available paths will be closed to control further operations.

The first group of these relays are called group relays and they are associated with the secondary switches of the district frame. Each different district frame will have as many of these group relays as there are verticals in the secondary switches and each relay will control a set of contacts for the corresponding verticals of each said secondary switch.

Similarly arranged relays associated with the primary switches of the office frame are known as gate relays and similarly arranged relays associated with the secondary switches of the office frame are known as channel relays.

The group relays are operated in accordance with the district primary switch in which the line incoming from the district junctor appears. The gate relays are operated in accordance with the district frame in which the line incoming from the district junctor appears and the office frame in which the selected group of outgoing trunks appear. The channel relay is jointly controlled by the operated group and gate relays.

In accordance with the present invention, when a route relay has been operated a connection will be established to the selected group of trunks through a common switching point and information will then be returned through this common switching point indicating the particular office frame on which the outgoing trunks appear. At the same time information will be transmitted during the operation of the route relay indicating the particular district frame on which the line from the district junctor appears. As a result a particular gate relay will be operated. The group relay being operated, the channel relay will now respond and a series connection involving the selecting magnets of the four switches controlling an available path is established. Responsive thereto the holding magnets of the four switches are sequentially operated and the selecting magnets are released. A feature of the invention is the means for automatically establishing a connection through a plurality of switches serially arranged by marking the incoming and outgoing circuits. In accordance with this feature the selection of the various links which are to be serially arranged is entirely automatic.

Another feature of the invention is the means for establishing a connection through a plurality of cross bar switches serially arranged consisting of means for establishing a series connection through a selecting magnet of each said switch and responsive thereto for sequentially operating the holding magnets of said switches, the operation of each succeeding holding magnet depending on and being responsive to the operation of the preceding said holding magnet. In accordance with this feature each holding magnet starting with that of the first switch in the sequence builds up the desired connection piece by piece the operation of any one holding magnet depending on the successful completion of the desired circuit to that point.

Another feature of the invention is the means for establishing a connection through a plurality of cross bar switches serially arranged from a circuit appearing in a first of said switches to a circuit appearing in the last of said switches by operating a relay associated with an intermediate one of said switches selected in accordance with the designation of said first and last switches. In accordance with this feature a control circuit for establishing the wanted connection is primarily established by automatically operating a relay associated with the particular district and office frames in which the incoming and outgoing lines appear.

Another feature of this invention is a means for determining a preferred path through a plurality of switches serially arranged consisting of the partial establishment of a plurality of available connections through means associated with said switches and the completion of one of said paths through a preference circuit associated with one of said switches.

Other features will appear hereinafter.

The drawings consist of twenty sheets having twenty-three figures, as follows:

Fig. 1 is a block diagram showing how Figs. 7 to 23 inclusive may be placed to form a complete circuit diagram;

Fig. 2 is a similar block diagram showing how Figs. 5 and 6 are to be placed to form a schematic circuit diagram;

Fig. 3 is a figure like that of Fig. 1 except that each block is labelled instead of numbered;

Fig. 4 is a figure like that of Fig. 2 except that each block is labelled instead of numbered;

Figure 6:
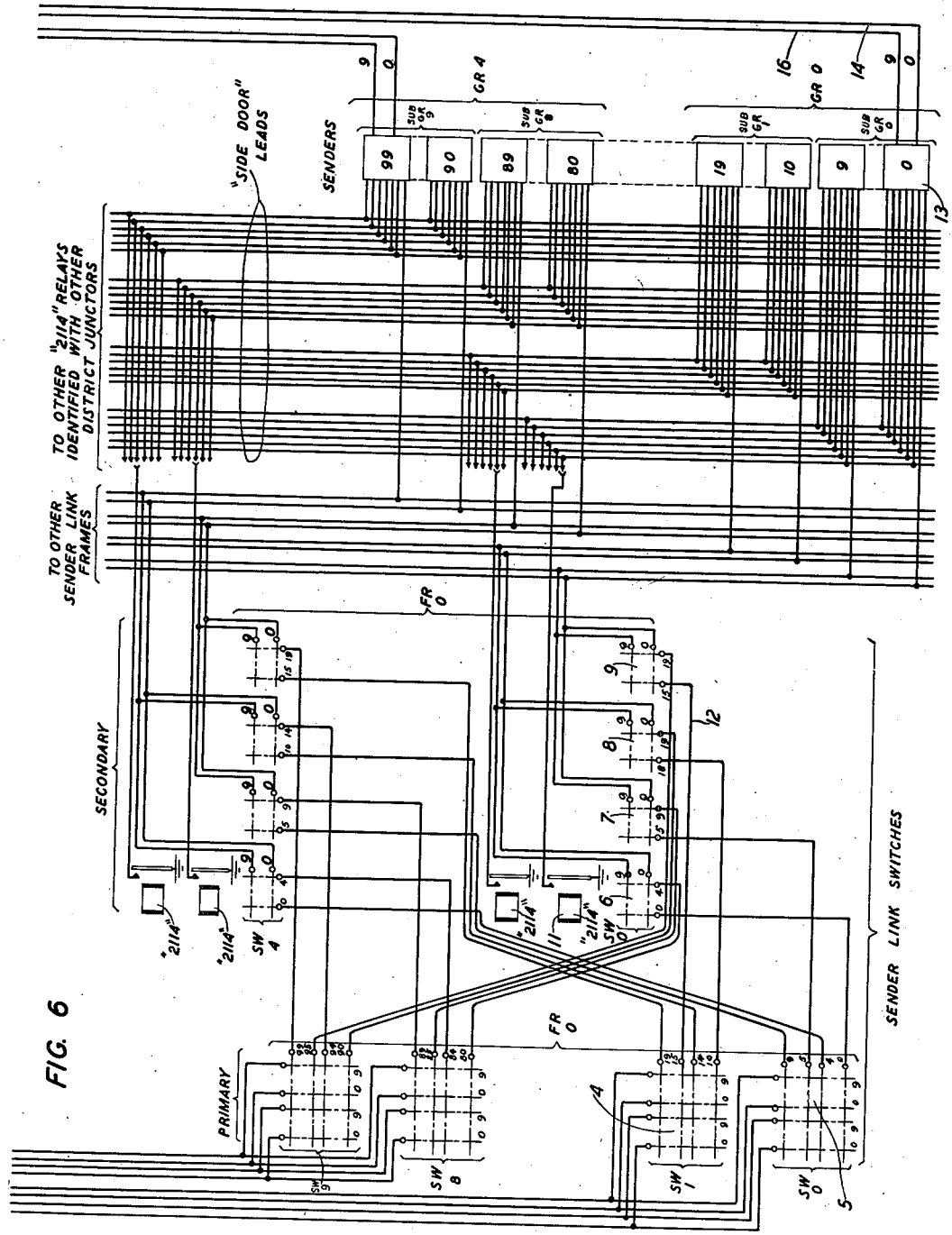
Figure 11:
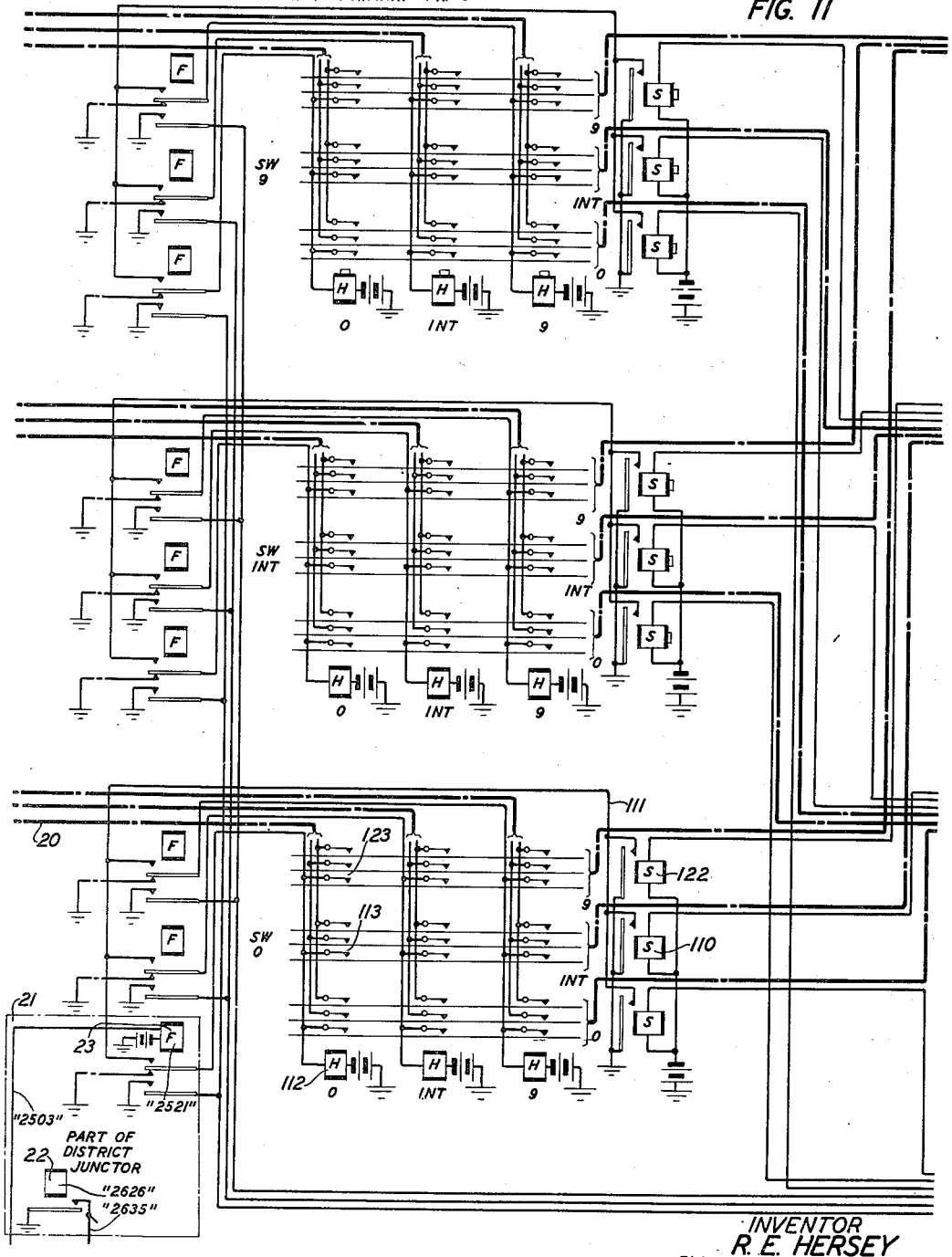
Figure 15:
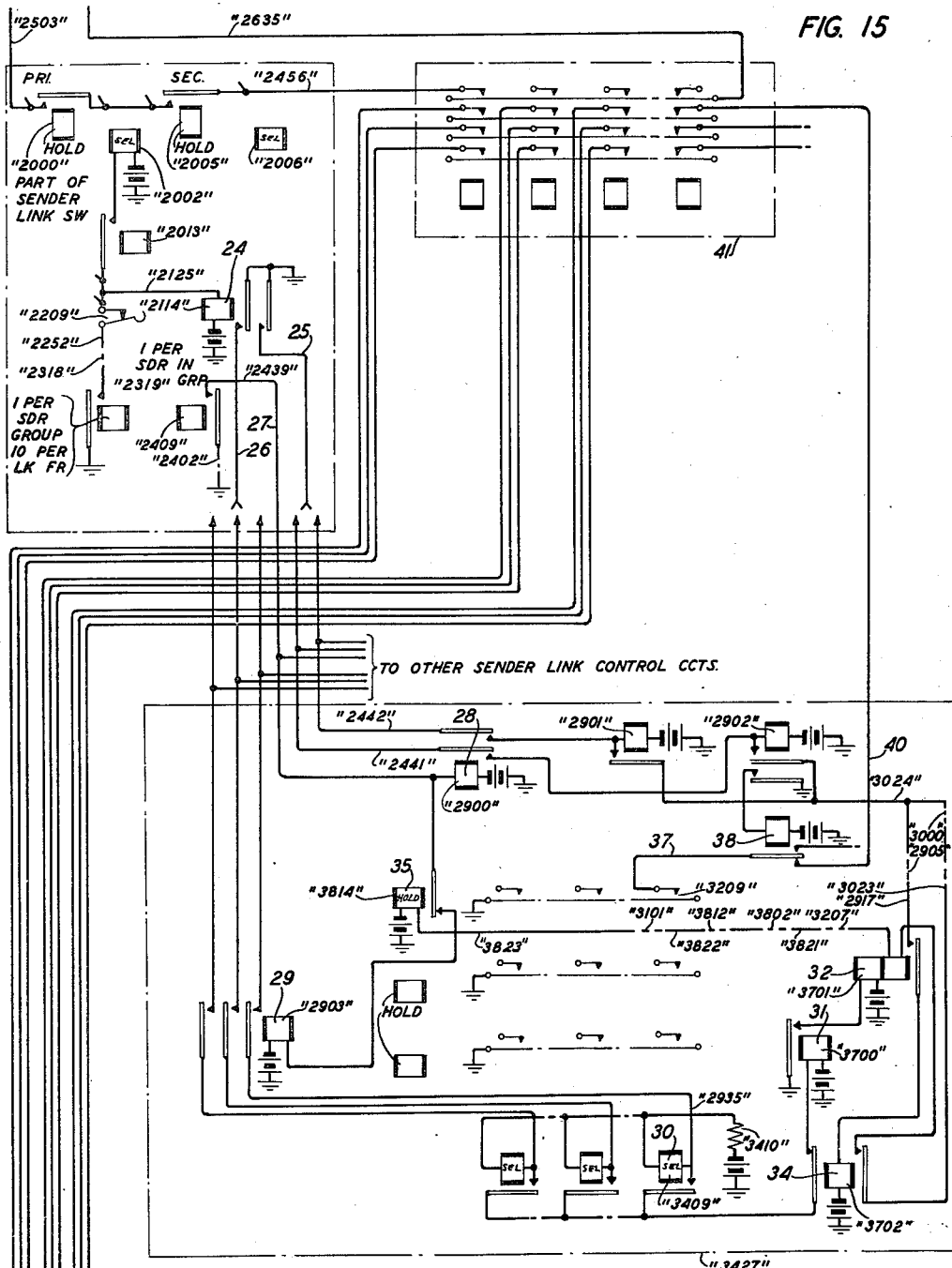
Figure 16:
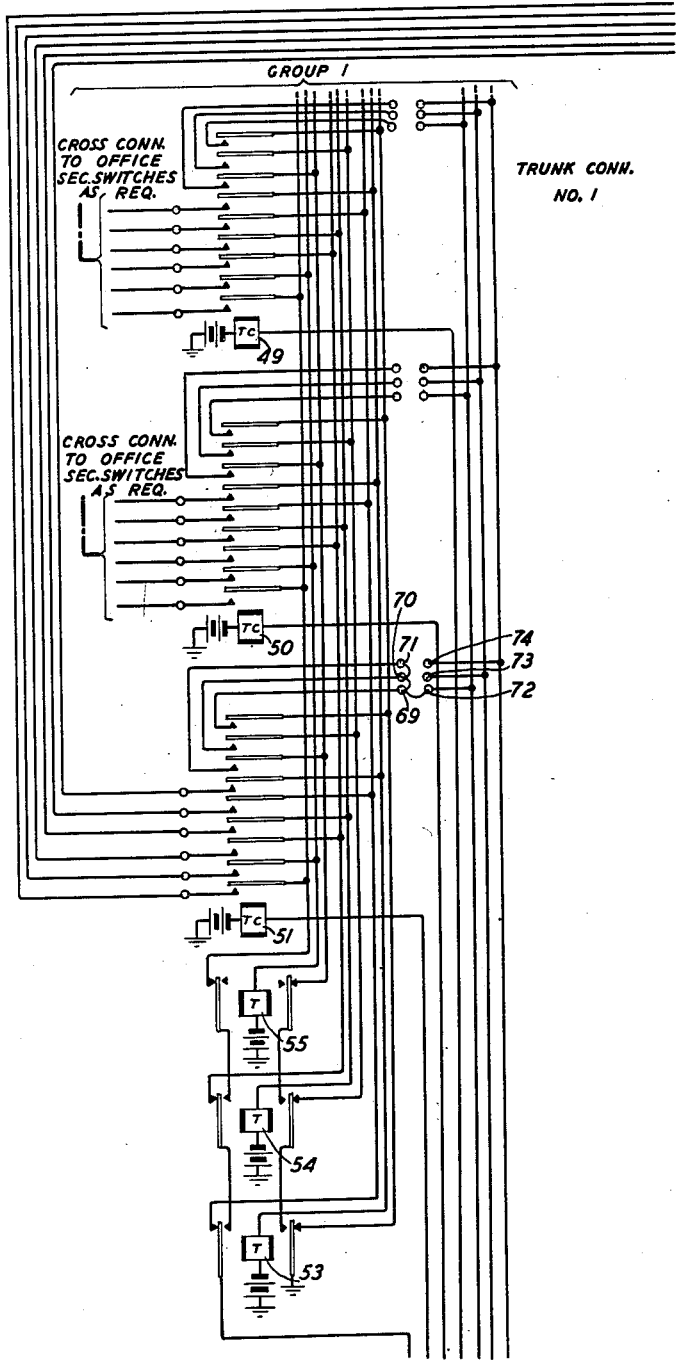
Figure 17:
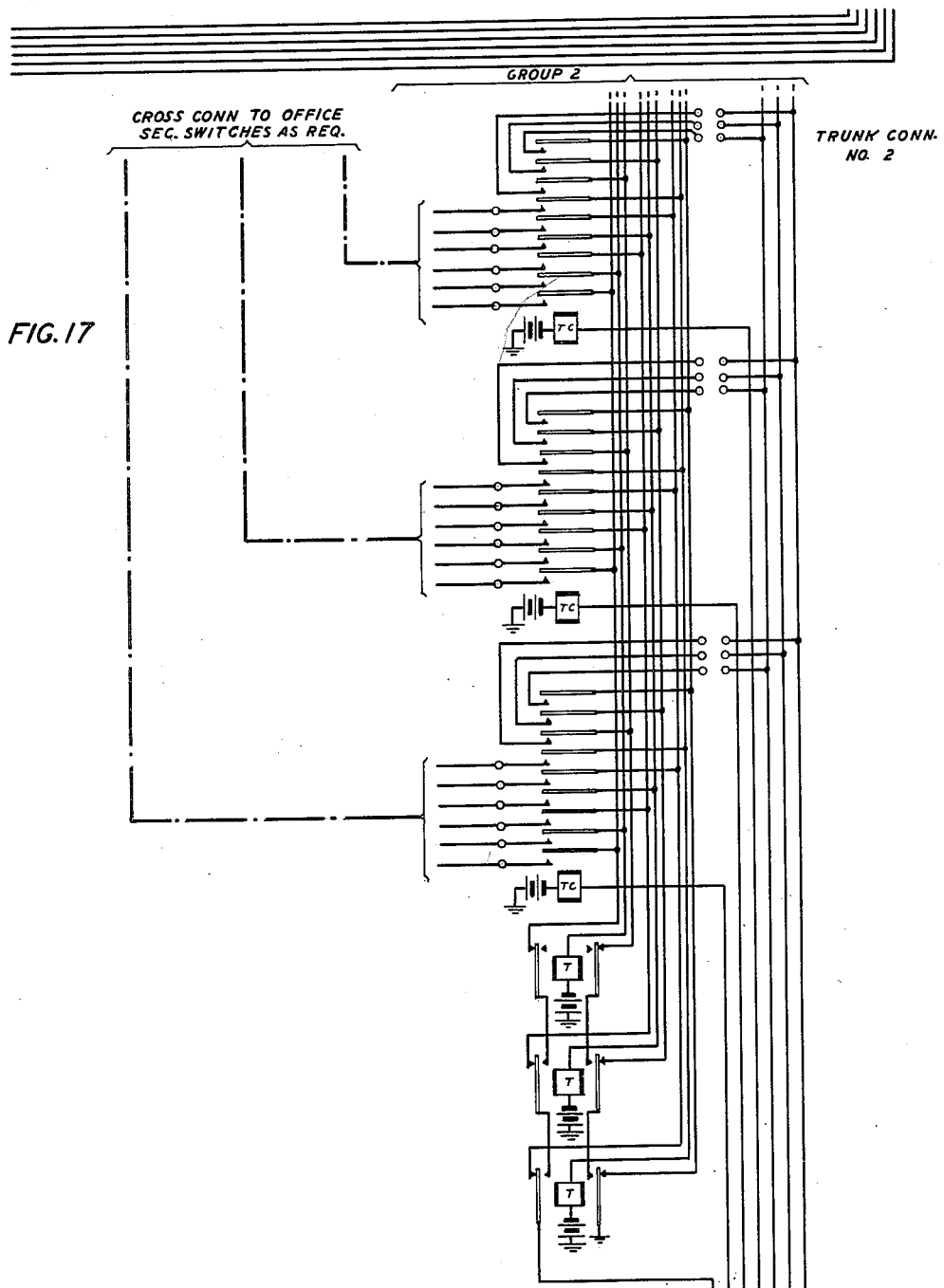
Figure 18:
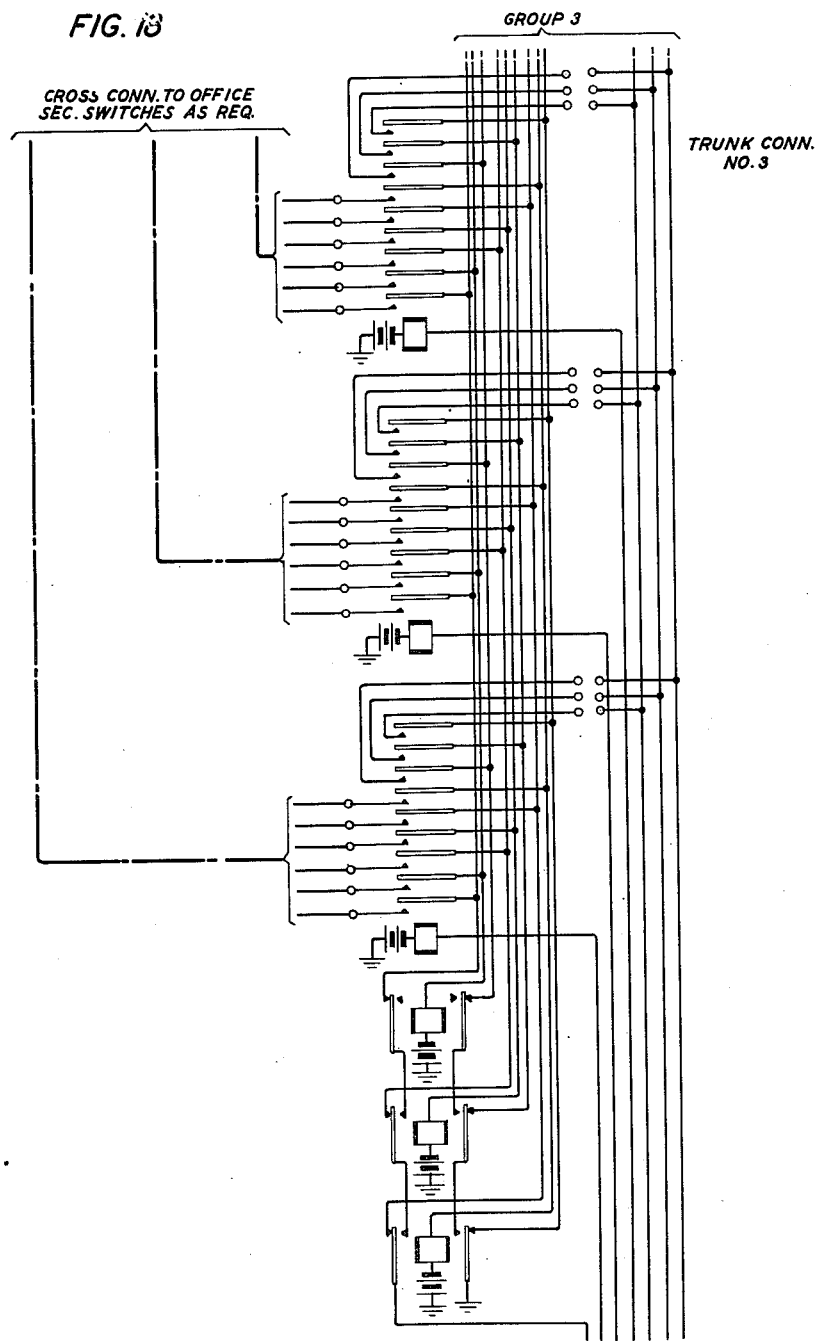
Figure 19:
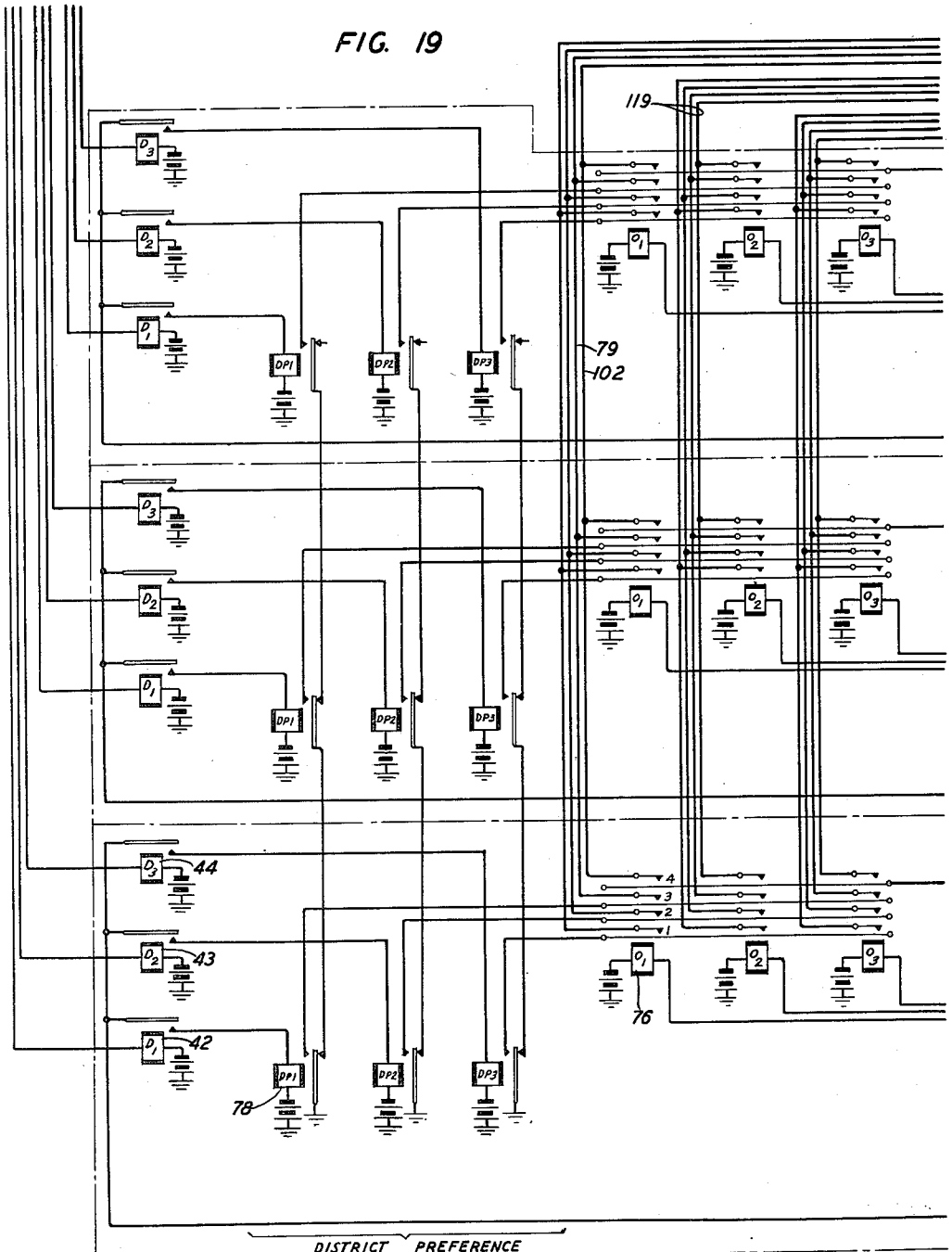
Figure 20:
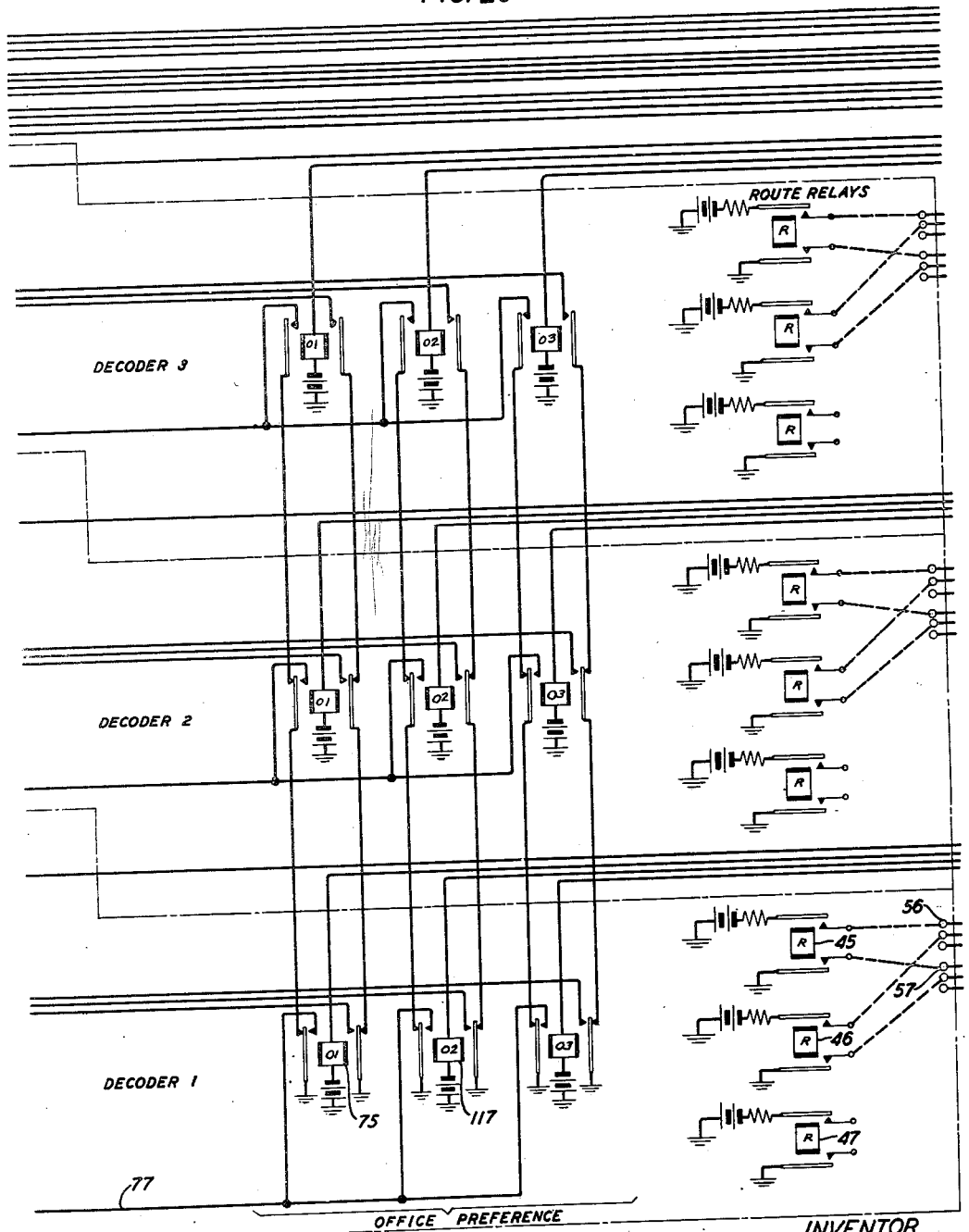
Figure 21:
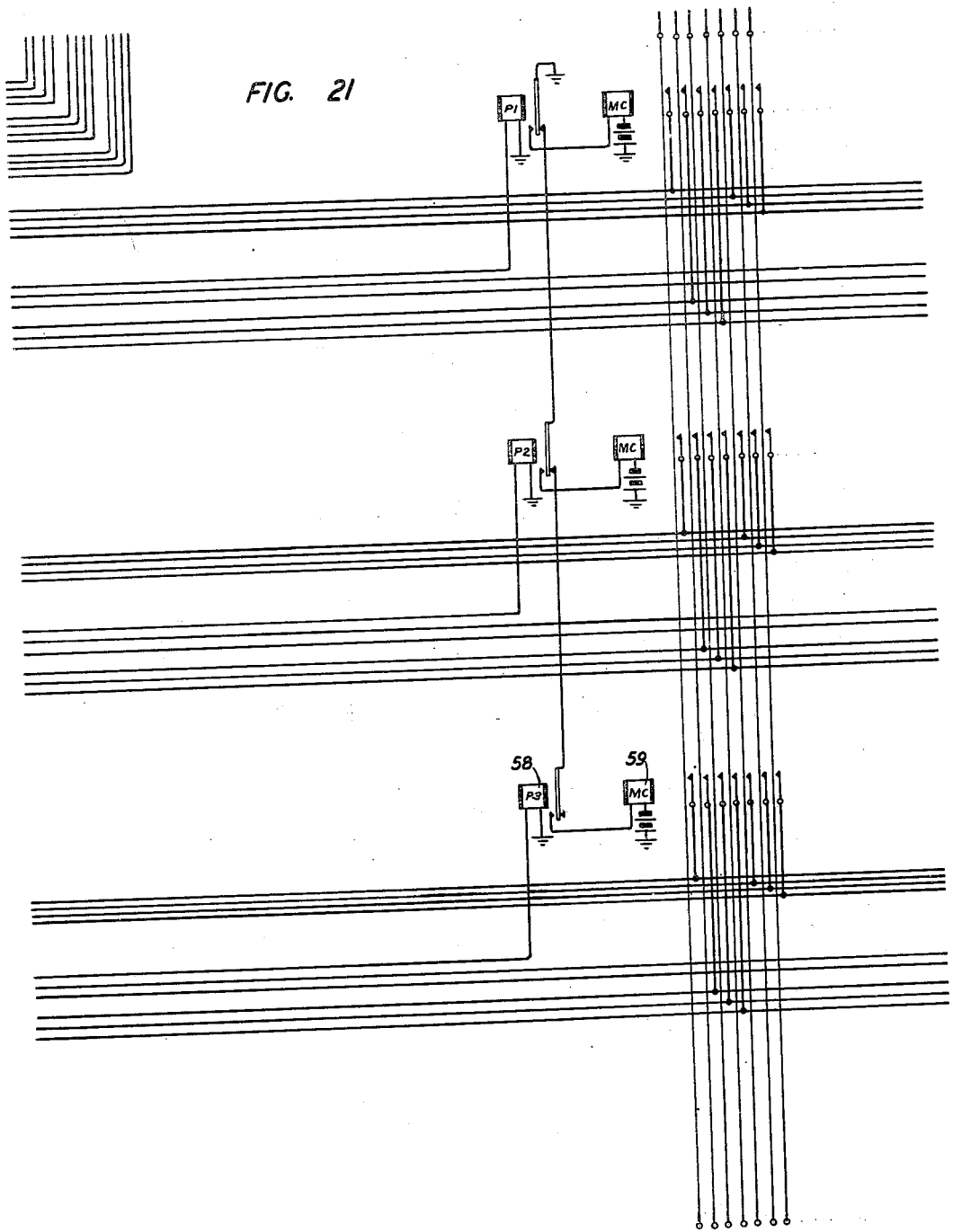
Figure 22:
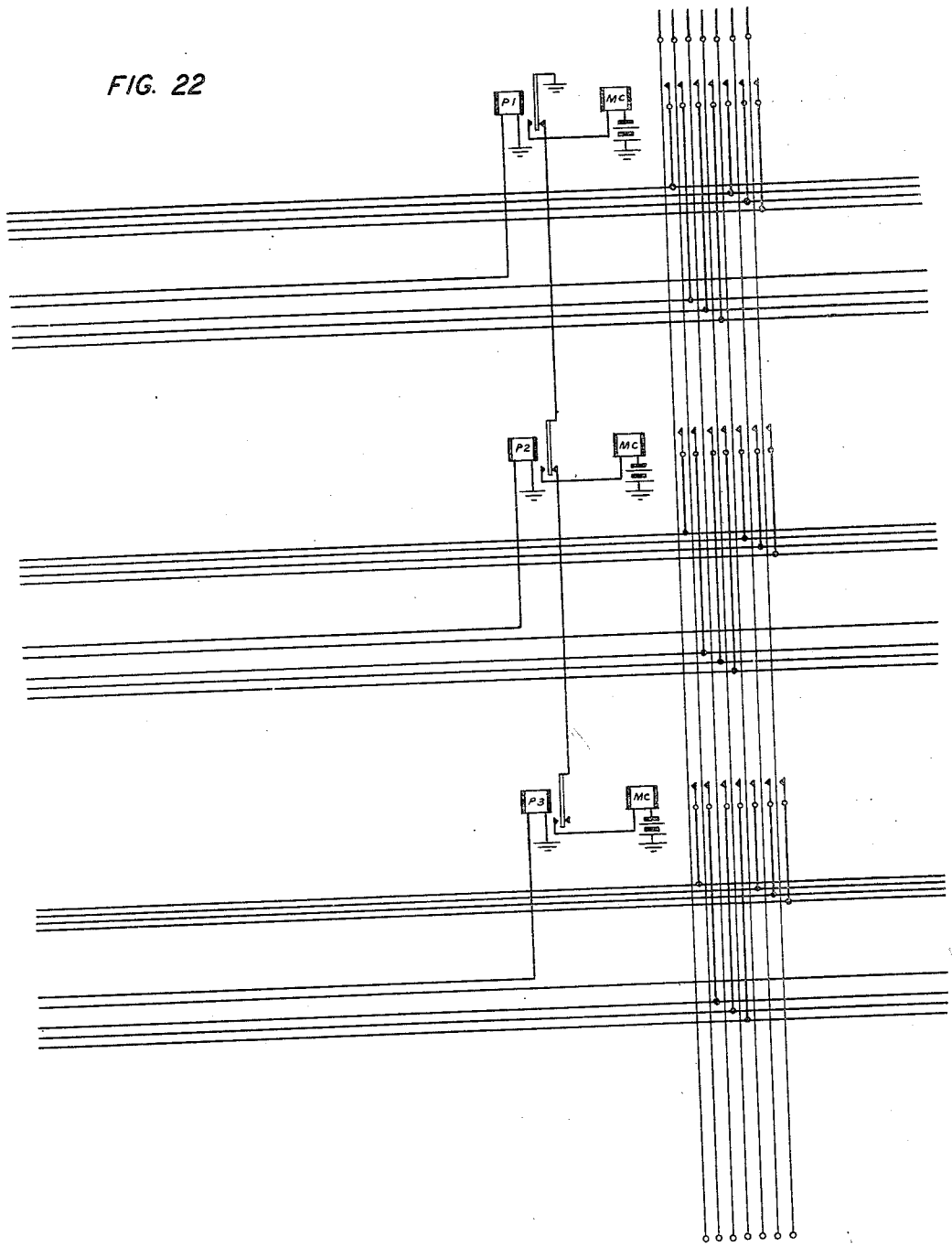
Figure 23:
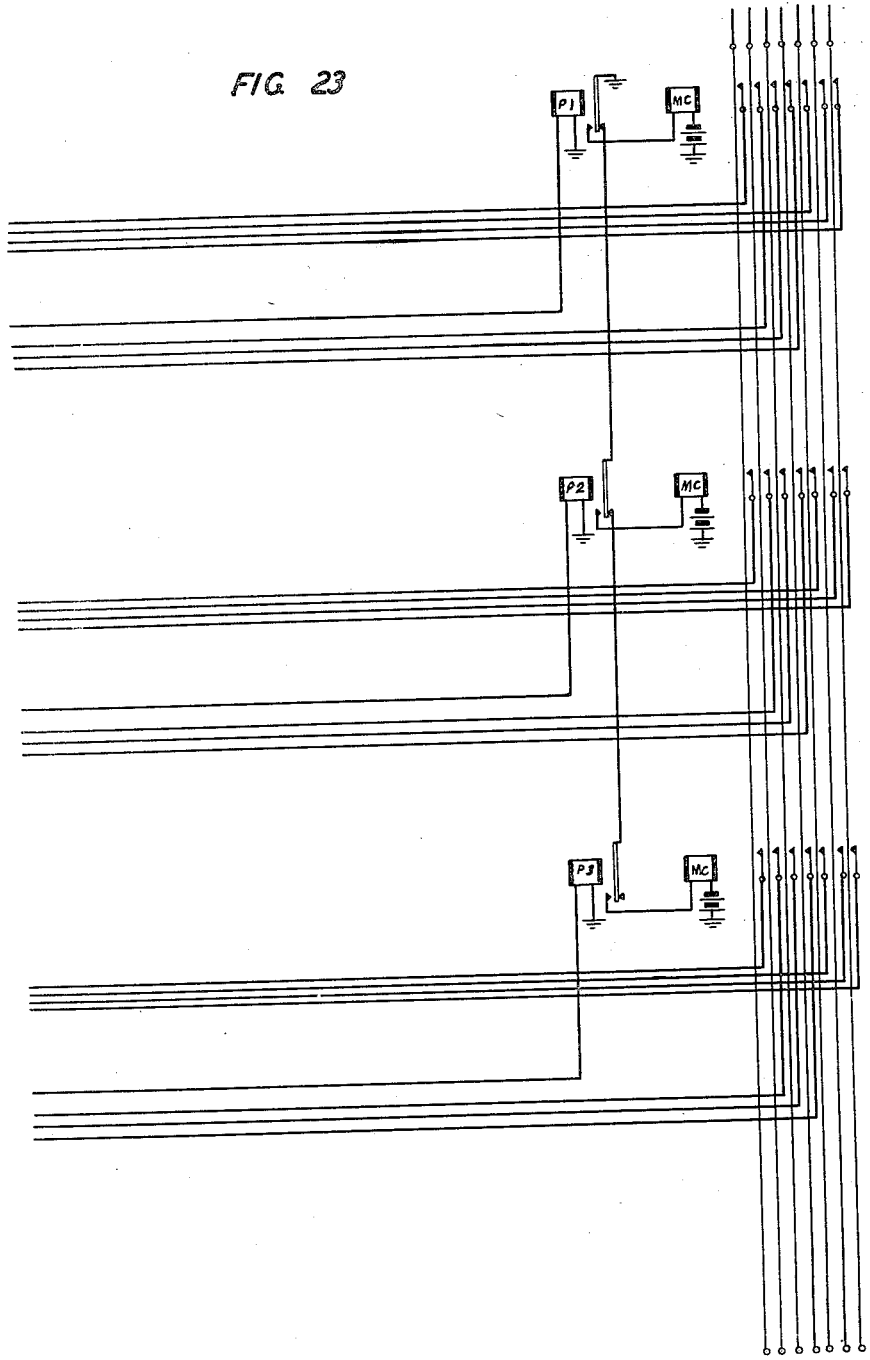

Figs. 5 and 6 form a schematic circuit diagram showing the prior art arrangement of a cross bar switching system a description of which is necessary for a clear understanding of the present invention and by means of which the number of sheets of drawings in the following complete circuit diagram may be materially reduced;

Figs. 7, 8, 9 and 10 are schematic circuit diagrams showing the first, and intermediate and the last switches in the primary and secondary groups of the intermediate and last of the district and office frames;

Figs. 11, 12, 13 and 14 are more detailed schematic circuit diagrams showing the first, an intermediate and the last switches in the primary and secondary groups of the first district and office frames;

Fig. 15 is a schematic circuit diagram showing highly abbreviated forms of circuits taken from the prior art and used to explain the manner in which the district frame is identified through the operation of the sender link frame, showing certain portions of the sender link circuits, the sender marker connector (of the prior art but not used in the present system) and the sender frame register;

Figs. 16, 17 and 18 show trunk connectors, whereby the groups of trunks leading in the wanted direction are temporarily connected to the common apparatus for the purpose of selecting an idle trunk and for identifying the office frame from which the selected trunk leads;

Fig. 19 is a schematic circuit diagram showing the district frame identification relays and the district preference circuit;

Fig. 20 is a schematic circuit diagram showing the route relays and the office preference circuit, and Figs. 21, 22 and 23 are schematic circuit diagrams showing the office frame identification relays and the trunk group selectors.

In explanation of the present invention reference is made to an article entitled "Crossbar dial telephone and switching system," by F. J. Scudder and J. N. Reynolds published in the Bell System Technical Journal, volume 18, January 1939, pages 76 et seq. and to Patent Number 2,235,803 issued March 18, 1941, to W. W. Carpenter. In order to make the present disclosure as clear as possible it has been placed in schematic form and will be explained with the help of numerous references to the full and complete circuits in the Carpenter patent.

Important operations in the present invention are the identification in common apparatus of the district frame in which a district junctor terminates and the office frame in which a selected trunk terminates. It is old in the prior art to identify the district frame involved in the subscriber's sender so that in the present disclosure the manner in which this is done is shown in highly schematic form. The principle of this operation may be explained shortly as follows: Each group of district junctors is individual to a given district frame and therefore the corresponding switches in the sender link frame are likewise individual to the said given district frame. However, since the senders are all common to the sender link switches, the identity of the district frame would be lost at this point were it not for special means taken to avoid this loss. Accordingly, there is provided in the sender link frame circuit a multicontact relay (identified as relay 2114 in the Carpenter patent) which is individual to the primary switch in the sender link frame and therefore individual to the district frame involved, one of whose duties it is to operate the sender frame register in the sender and to thus establish in the sender the identification of the district frame involved. Thus, out of the sender, common to all district frames, will come the proper identification of the district frame which will be used in the establishment of a connection.

This is illustrated in Figs. 5 and 6. Here it will be noted that primary and secondary line switches, district junctors, primary and secondary district and office switches, primary and secondary sender link switches and senders are shown schematically. By way of example let it be assumed that the subscriber at station 1 wishes to establish a call. Upon removing his telephone from its cradle his line will be automatically extended to an idle subscriber's sender. His line appears in number 9 primary line switch. Through the usual control, let it be assumed that this line is then extended through line link 2 leading to the number 0 secondary line switch and is thereby extended to district junctor 3. This district junctor in its outgoing end appears in the primary switch number 0, of let us say, district frame number 0. This same district junctor also appears in switches 4 and 5 which are primary switches in the subscriber's sender link frame, and it will be seen that these switches serving various sub-groups of district junctors all appearing in the same district frame are thus individual to that district frame. The secondary switches 6, 7, 8 and 9 are also individual to the same district frame. But the senders are common and hence the identity of the district frame serving district junctor 3 is lost as the connection is extended beyond the sender link secondary switch. However, a multicontact relay 11 is operated from the primary switch control circuit when the connection is extended by way of example through primary switch 4, over sender link 12, through secondary switch 9 to the sender 13. Relay 11 will operate means in the sender 13 which will result in marking conductor 14 coming out of the sender and thus identifying the district frame involved beyond the sender for any purpose needed. A similar relay operated from the primary switch control circuit for switches individual to another district frame will cause another conductor 16 to be marked to thus identify a different district frame. The conductors 14 and 16 may be extended through the usual connector switches such as 10 to any one (such as 15) of a plurality of decoders (or markers as in the prior art). The present invention provides an important role for this district frame identification. Through this operation plus others to be described a path from the district junctor 3 will be established through the switches of the district and office frames to an outgoing trunk leading toward the wanted connection, without the use of the immensely complicated marker.

The relays such as 11 operate the sender frame registers in the senders through selective connections made to the "side door leads" as indicated in Fig. 6 and as fully explained in the Carpenter patent.

In considering the more complete circuit diagrams of Figs. 7 to 23, let it be assumed that a district junctor partially represented by the incoming channel 20 and the broken line rectangle 21 has been seized. In this connection and for the present purposes it is sufficient to state that a relay 22 (identified as relay 2626 in the Carpenter patent) is operated so that eventually through a circuit shown schematically in Fig. 11 (and marked with various identifying numerals from the Carpenter patent) the F relay 23 is operated. It will then be assumed without further showing that a subscriber's sender has been reached.

In this operation and in a manner fully explained in the Carpenter patent, relay 24 individual to the primary sender link frame switches and therefore individual to the district frame in which district functor 21 terminates will be operated. Relay 24 among its other duties, grounds two conductors 25 and 26, which may as indicated be arranged to lead to certain select and hold magnets of the sender frame register. A ground on conductor 27 will operate relays 28 and 29 in parallel. Relay 29 will extend the ground on that conductor to which conductor 26 is connected to select magnet 30, which upon operation will further extend this ground to relay 31 and cause the operation of relay 32. Relay 28 will extend the ground on that conductor to which conductor 25 is connected to relay 33, which upon operation will further extend this ground to relay 34, which will open the connection to relay 31 but will close a holding circuit through the right-hand winding of relay 32 to the hold magnet 35. Magnet 35 opens the circuit of relay 29 to release the select magnet but before this has been accomplished the contacts 36 have been closed. Removal of ground from conductor 27 will release this connection in time.

Closure of contacts 36 will ground conductor 37 to identify the district frame in which the district junctor terminates. A relay 38 is shown as under control of a relay 39 so that in accordance with the connection of conductor 25 to one or the other of its choices the conductor 37 will be extended over a back or a front contact of relay 38. In a full sized office wherein twenty district frames are used, ten conductors like 37 may be used to mark twenty conductors like conductor 40 connected to the back contact of relay 38 and thus identify any one of the said twenty district frames.

In the usual full sized office where four or five markers are employed the conductors like conductor 40 coming from a plurality of let us say ten senders are brought into the smaller number of markers by the well-known marker connector. In the present instance a similar means is used to bring the district frame identification conductors into a smaller number of decoders. Thus in Fig. 15 there is shown in a broken line rectangle 41 a schematic representation of the usual connector whereby the identifying conductor 40 may be extended to a corresponding relay in any one of the decoders.

In Figs. 19 and 20, three decoders are shown schematically and these will serve to indicate the total number employed. In tracing one operation of the present system as an example it will be assumed that by the usual means the lowermost decoder has been allocated for use. At the extreme left there are three relays 42, 43 and 44, which will represent the twenty of such relays used in a full sized office each one serving to identify a corresponding one of the twenty district frames. It will thus be seen that relay 42 will identify the particular district frame in which the district junctor 21 terminates.

In Fig. 20 there are shown three relays 45, 46 and 47. These are the usual route relays and there are as many of these relays as there are routes over which connections may be extended from the office frames. Each such route relay is operated in response to the registration in the sender of the (usually three place) office code, which is transferred to the decoder over a connector such as A1.

Each decoder has a similar set of route relays and corresponding route relays in each decoder will perform the same functions. It has been assumed that decoder number 1 (including route relays 45, 46 and 47) has been appropriated. Let it now be assumed that in response to the registration of the wanted office code that route relay 45 has become energized.

Figure 12:
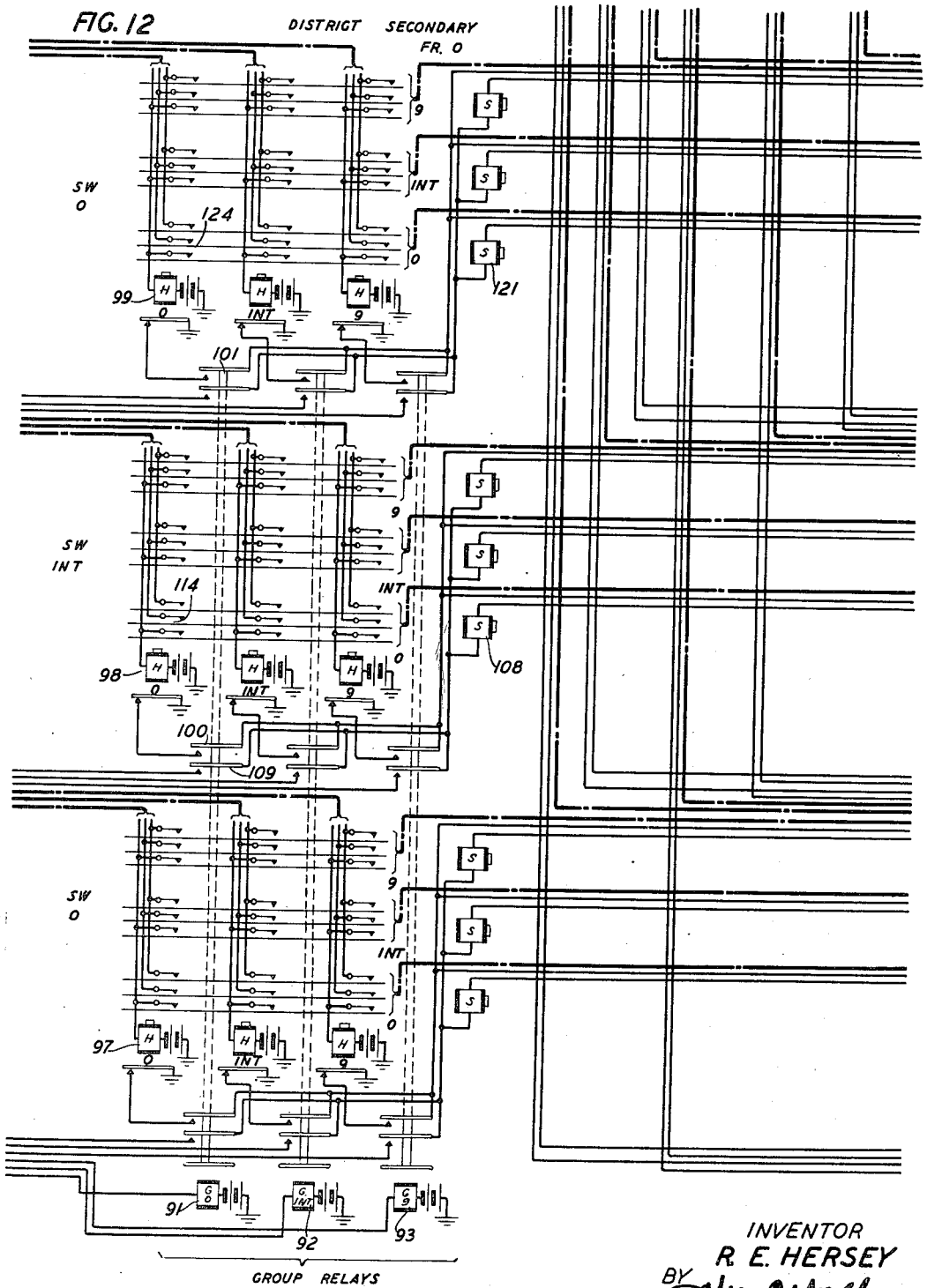
Figure 13:
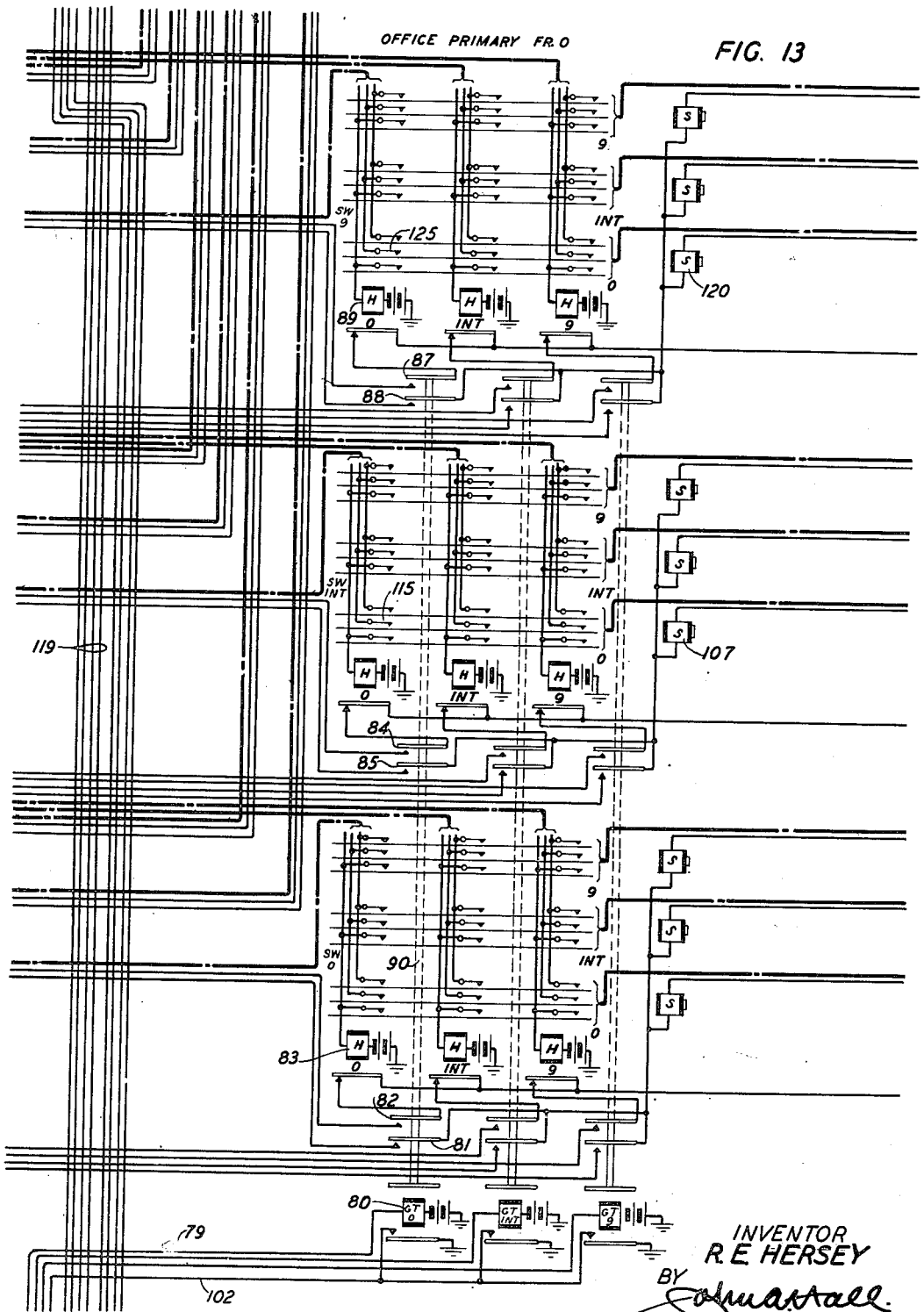
Figure 14:
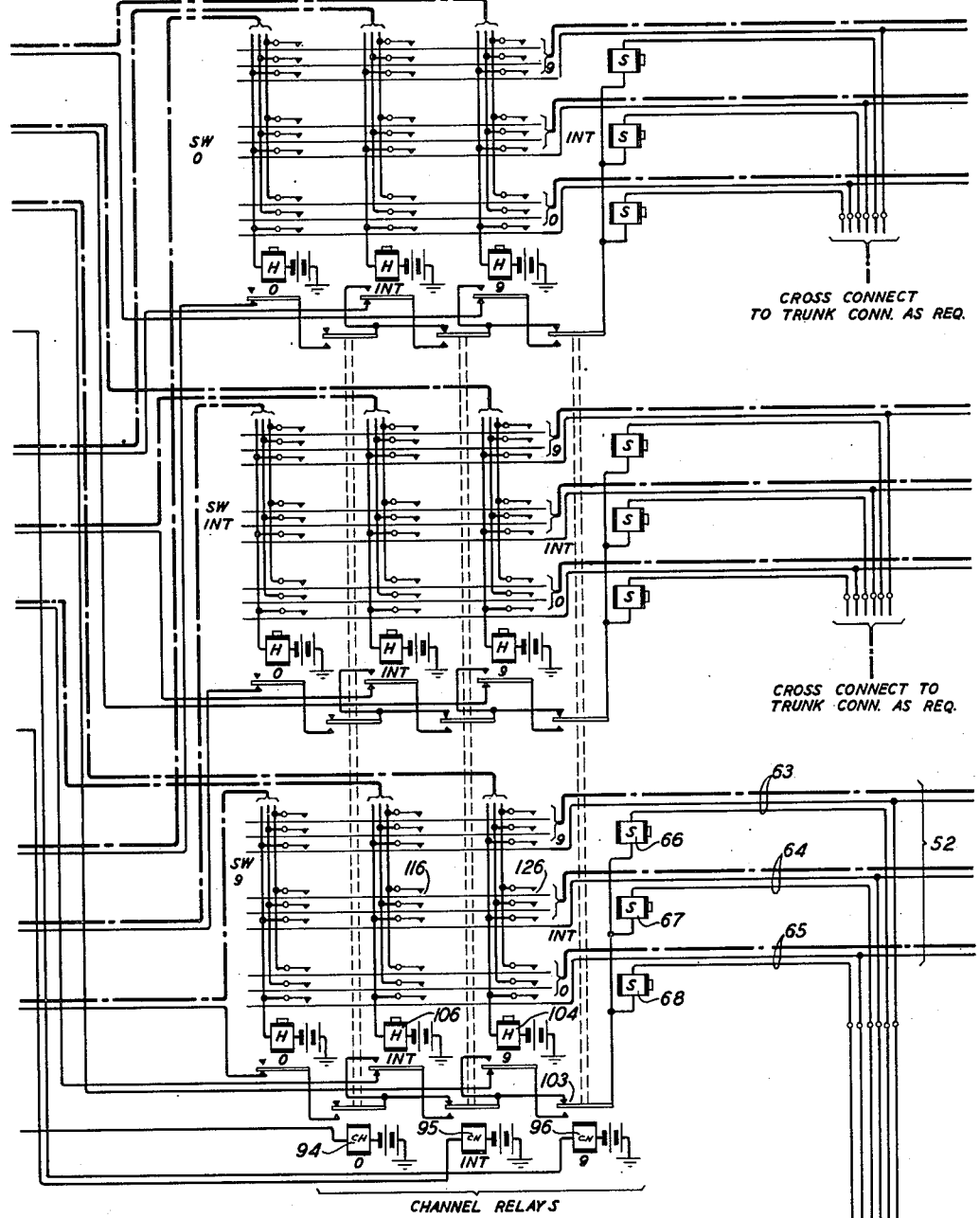

The primary function of the route relay in the present invention is to cause the operation of a particular and corresponding trunk connector relay, such as one of the relays 49, 50 or 51 shown in Fig. 12 or like relays shown in Figs. 13 and 14 and which selected and operated relay will connect the sleeves of all trunks providing the wanted route to a set of common testing relays for the selection of an idle one therefrom. Thus the trunk connector relay 51, as will be seen, will connect the sleeve of each trunk of the group 52 (Fig. 10) to the testing relays 53, 54 and 55.

The trunk connector relay 51 is a multicontact relay and may serve any sized group of trunks and there may be a corresponding number of testing relays 53 to 55. By way of example there may be forty trunks in the group 52 and the set of testing relays 53 to 55 may correspondingly comprise a group of forty such relays.

In order that the system be flexible it is arranged that the contacts of the route relay be cross-connected in any desired manner to the trunk connector relays. Thus the contacts of route relay 45 are cross-connected to the terminals 56 and 57. Therefore upon the operation of relay 45, preference relay 58 will be energized to operate the multicontact relay 59. A connection may then be traced from ground, the lower armature and contact of route relay 45, terminal 57, armature 2 and front contact of multicontact relay 59, winding of trunk connector relay 51 to battery, resulting in the operation of relay 51.

Now it will be noted that testing relay 53 has its winding connected to the sleeve of trunk 63 and the outer contact of its left-hand armature is connected to the winding of select magnet 66 which controls the horizontal cross bar which serves the trunk 63. Like connections are provided for testing relays 54 and 55. The back contact of the right-hand armature of each testing relay leads through an armature of the multicontact trunk connector relay to a corresponding cross-connecting terminal, the terminals 69, 70 and 71 corresponding respectively to relays 53, 54 and 55. Lined up with these terminals and in a position for ready cross-connection is a series of terminals 72, 73 and 74 which here represent one such terminal for each office frame (a maximum of twenty in a full-sized office). If all of the trunks come out of the same office frame then the terminals 69, 70 and 71, one for each trunk in the group, are multipled together and then cross-connected to that one of the terminals 72, 73 and 74 representing the office frame involved. But in a system of this kind it is not necessary that the outgoing trunks be grouped together. As an extreme example there may be twenty trunks in the group each one in a different office frame and in that case each of the twenty different terminals such as 69, 70 and 71 will be cross-connected to a different but corresponding one of the terminals 72, 73 and 74.

In the present case since all three trunks 63, 64 and 65 are in the same office frame, the terminals 69, 70 and 71 are shown as multipled and then cross-connected to terminal 72 representing the office frame involved.

Let us now by way of example assume that trunks 63 and 65 are busy and that trunk 64 is idle. Therefore relays 53 and 55 will be energized and relay 54 will be in its released condition. Ground at the right-hand armature of relay 53 will be extended through the armature and back contact of relay 54 to terminal 70 and thence to terminal 72, whence it may be traced through armature 3 of the multicontact relay 59 to the winding of relay 75 and thence to battery. As there are a number of terminals 72, 73 and 74 equal to the number of office frames, so there are a number of relays like relay 75, each corresponding to an office frame.

Thus with relay 42 operated to identify the district frame serving the junctor 21 and relay 75 operated to identify the office frame serving trunk 64, these two relays will control the automatic selection of a connection between such district junctor 21 and such selected idle trunk 64.

Relay 75 in operating will cause the operation of multicontact relay 76. Relay 75 will also close a contact through its left-hand armature to place ground on conductor 77 which will now extend through the armature and contact of operated relay 42 to cause the operation of relay 78. Relay 78 now closes a circuit from ground its armature and front contact, contacts 3 of multicontact relay 76, conductor 79 to gate relay 80, causing this last relay to operate.

It will be noted that there is one gate relay for each vertical of the primary switches of the office frame and that each gate relay has a set of contacts for each primary switch of the office frame. Thus relay 80 has armatures 81 and 82 for service with primary switch 8 and corresponding to the vertical controlled by hold magnet 83 armatures 84 and 85 for service with the intermediate primary switch and corresponding to the vertical controlled by hold magnet 86 and armatures 87 and 88 for service with primary switch 9 and corresponding to the vertical controlled by hold magnet 89. In the physical structure gate relay 80 is a multicontact relay and the arrangement indicated by the broken lines 90 is taken care of entirely by wiring and not by physical placement of the armatures, such as 87 and 88 near the hold magnet 89. Thus where the primary switches of the office frame has ten verticals there will be ten such gate relays and each frame will have a set so that with twenty office frames there will be two hundred gate relays.

Before going further it should be noted that there is a similar arrangement of group relays, such as 91, 92 and 93 associated with the secondary switches of each district frame and a similar arrangement of channel relays such as 94, 95 and 96 associated with the secondary switches of each office frame.

It has heretofore been stated that the F relay of the district junctor 21 has become operated. This will result in the operation of group relay 91 in an obvious circuit. Let it now be assumed that the vertical controlled by holding magnet 97 is in use and that therefore magnet 97 is operated. Hence through the operation of group relay 91 one circuit may be traced from ground, armature and back contact of hold magnet 98, front contact and armature 100 of group relay 91, front contact and armature 84 of gate relay 80, through the back contact and armature of hold magnet 86, the winding of channel relay 95 to battery. A similar circuit may be traced from ground armature and back contact of hold magnet 99, front contact and armature 101 of group relay 91, front contact and armature 87 of gate relay 80, back contact and armatures of hold magnet 89, winding of channel relay 96 to battery. The number of such channel relays which become operated upon the operation of a group relay and a gate relay is an indication of the number of alternative available paths through the switches of the district and office frames involved. One of these paths is now selected as follows.

The operation of gate relay 80 places ground on conductor 102 and this is now extended through contacts 4 of relay 76, armature 1 of multicontact relay 59, left armature and front contact of testing relay 53, left armature and back contact of testing relay 54, armature 3 and front contact of trunk connector relay 51, winding of selecting magnet 67, armature 103 and front contact of channel relay 96, armature and front contact of holding magnet 104 (assuming this vertical to be in use) armature 105 and front contact of channel relay 95, armature and back contact of holding magnet 106, selecting magnet 107 of an intermediate primary office frame switch, armature 85 and front contact of gate relay 80, selecting magnet 108 of an intermediate secondary district frame switch, armature 109 and front contact of group relay 91, selecting magnet 110 to battery. Selecting magnets 67, 107, 108 and 110 in series will operate. Selecting magnet places ground on conductor 111 so that this is now extended through an armature of the F relay 23 to the sleeve of the line 20 incoming from the district junctor 21 to operate hold magnet 112 (the ground for holding hold magnet 112 being supplied from another point shortly in accordance with conventional practice). Contact set 113 will operate and extend the sleeve ground to the winding of magnet 98 which will forward the connection through contact set 114. Contact set 114 will extend the sleeve ground to hold magnet which will operate and forward the connection through contact set 115. Contact set 115 will extend the sleeve ground to hold magnet 106 which will operate and forward the connection through contact set 116 to the selected trunk 64.

Upon the operation of hold magnet 98 the ground supplied to the front contact of armature 100 of group relay 91 is removed and as a consequence channel relay 95 is released, thus opening at one point the series circuit through the four selecting magnets 67, 107, 108 and 110. While in the description the operation of the four hold magnets 112, 98, 86 and 106 is a sequential or step-by-step operation it will be realized that this is sufficiently rapid and that the selecting magnets are sufficiently slow in releasing to complete the actuation of the contact sets 113, 114, 115 and 116 before the selecting magnets are released even though their circuit is initially broken upon the energization of the second holding magnet in the series.

It may be noted at this point that upon the extension of the connection to trunk 64 a ground will be extended to the sleeve thereof and that in consequence relay 54 will become energized. If the making busy of trunk 64 now renders all trunks of this group busy the gate relay 80 will be released; otherwise gate relay 80 will remain energized from some other idle trunk of the group. However, this is of little consequence since the placing of ground on the sleeve wire 20 will have the usual effect of signaling the establishment of the connection to the district junctor whereby the common apparatus will be dropped in the conventional manner. Relay 23 of the district junctor will be released, in turn releasing the group relay 91. The channel relay 95 has been released through the establishment of the connection and the remaining operated channel relays are now released by the release of the group relay 91. The gate relay 80 is released through the release of the common apparatus by which the district frame relay 42 and the route relay 45 are released.

While the present invention has been illustrated by describing the establishment of a connection originating in the first district frame and terminating in the first office frame it will be apparent that any combination of district and office frames may be used. Thus if the desired group of outgoing trunks had been in an intermediate office frame and the cross-connection from the terminals 69, 70 and 71 had been to terminal 73 instead of 74, then office frame relay 117 instead of office frame relay 75 would have been energized. As a consequence multicontact relay 118 would have become energized in place of relay 76 and a gate relay reached over cable 119 would have been operated. It will be readily apparent through the pattern of cross-connections now a path would then have been established from the district junctor in the first district frame to a selected trunk in an intermediate office frame.

It will further be noted that the circuit controlled by the armatures of the channel relays (94, 95 and 96) and the corresponding holding relays is a preference circuit of conventional design whereby when a plurality of equivalent available paths through the switches of the district and office frames are signalled by the operation of a plurality of channel relays, that the first in the chain will be taken for use. Thus, if in the description it had not been assumed that the holding magnet 104 was operated, a series circuit through selecting magnets 67, 120, 121 and 122 instead of 67, 107, 108 and 110 would have become effective and the desired path would have been established through contact sets 123, 124, 125 and 126.

What is claimed is:

1. In a switching system, a plurality of groups of switches arranged for extending an incoming line serially through a switch of each group to an outgoing line, incoming lines appearing in switches of the first of said groups, outgoing lines appearing in switches of the last of said groups; means operative over an incoming line for selectively designating a called outgoing line, means for identifying the switch in which said incoming line appears, means for identifying the switch in which said outgoing line appears, and means associated with an intermediate group of said switches responsive to said identifying means for operating a switch of each said group to establish a connection between said incoming and said outgoing line.

2. In a switching system, a plurality of groups of switches arranged for extending an incoming line serially through a switch of each group to an outgoing line, incoming lines appearing in switches of the first of said groups, outgoing lines appearing in switches of the last of said groups, means operative over an incoming line for selectively designating a called outgoing line, means for identifying the switch in which said incoming line appears, means for identifying the switch in which said outgoing line appears, means associated with an intermediate group of said switches responsive to said identifying means for establishing a plurality of operating circuits, each said operating circuit being capable of controlling said switches to complete a connection between said incoming line and said outgoing line and a preference circuit for rendering a preferred one of said operating circuits effective.

3. In a switching system, a plurality of groups of switches arranged for extending an incoming line to an outgoing line, said plurality of groups being divided into a plurality of sections incoming lines appearing in switches of a first section of said plurality of groups, outgoing lines appearing in switches of a last section of said plurality of groups, means operative over an incoming line for selectively designating a called outgoing line, means for identifying the group of switches in which said incoming line appears, means for identifying the group of switches in which said outgoing line appears, means associated with each said group of switches in said last section responsive to said identifying means for controlling said switches to establish a connection through said switches from said incoming line to said designated outgoing line.

4. In a switching system, a plurality of groups of switches arranged for extending an incoming line to an outgoing line, said plurality of groups being divided into a plurality of sections, incoming lines appearing in switches of a first section of said plurality of groups, outgoing lines appearing in switches of a last section of said plurality of groups, means operative over an incoming line for selectively designating a called outgoing line, means for identifying the group of switches in which said incoming line appears, means for identifying the group of switches in which said outgoing line appears, said switches in each said group being arranged in subgroups, group relays associated with a last of said subgroups being responsive to the identity of a switch in a first of said subgroup in which an incoming line appears, gate relays associated with each first of said subgroups in said last section of said plurality of groups responsive to said identifying means, means controlled by said group and gate relays for establishing switch controlling connections and means automatically responsive thereto for operating said switches.

5. In a switching system, a plurality of groups of switches arranged for extending an incoming line to an outgoing line, said plurality of groups being divided into a plurality of sections incoming lines appearing in switches of a first section of said plurality of groups, outgoing lines appearing in switches of a last section of said plurality of groups, means operative over an incoming line for selectively designating a called outgoing line, means for identifying the group of switches in which said incoming line appears, means for identifying the group of switches in which said outgoing line appears, said switches in each said group being arranged in subgroups, subgroup relays associated with a last of said subgroups, said subgroup relays in said groups of switches in said first section of said plurality of groups of switches herein called group relays being responsive to the identity of a switch in a first of said subgroups in which an incoming line to be extended appears, relays herein called gate relays associated with each first of said subgroups in said last section of said plurality of groups being responsive to said identifying means, said subgroup relays in said groups of switches in said last section of said plurality of groups of switches herein called channel relays being jointly controlled by said group relays and said gate relays, means controlled by said group, said gate and said channel relays for establishing switch controlling connections, and means automatically responsive thereto for operating said switches.

6. In a switching system, a plurality of groups of switches arranged for extending an incoming line to an outgoing line, said plurality of groups being divided into a plurality of sections, incoming lines appearing in switches of a first section of said plurality of groups, outgoing lines appearing in switches of a last section of said plurality of groups, a plurality of route relays associated with said incoming lines for marking for connection with one of said incoming lines a selected one or one of a group of equivalent outgoing lines, groups of outgoing line test relays associated with said outgoing lines, common switching means for connecting to a particular group of said testing relays under control of said route relays, means for identifying the group of switches in which said incoming line appears, means associated with each said group of testing relays operating through said common switching means for identifying the group of switches in which said outgoing line appears, said switches in each said group being arranged in subgroups, subgroup relays associated with a last of said subgroups said subgroups relays in said groups of switches in said first section of said plurality of groups of switches herein called group relays being responsive to the identity of a switch in a first of said subgroups in which an incoming line to be extended appears, relays herein called gate relays associated with each first of said subgroups in said last section of said plurality of groups being responsive to said identifying means, said subgroup relays in said groups of switches in said last section of said plurality of groups of switches herein called channel relays being jointly controlled by said groups relays and said gate relays, means controlled by said group, said gate and said channel relays for establishing switch controlling connections, and means automatically responsive thereto for operating said switches.

7. In a switching system, a plurality of groups of switches arranged for extending an incoming line to an outgoing line, plurality of groups being divided into a plurality of sections, incoming lines appearing in switches of a first section of said plurality of groups, outgoing lines appearing in switches of a last section of said plurality of groups, a plurality of route relays associated with said incoming lines for marking for connection with one of said incoming lines a selected one or one of a group of equivalent outgoing lines, groups of outgoing line test relays associated with said outgoing lines, common switching means for connecting to a particular group of said testing relays under control of said route relays, means for identifying the group of switches in which said incoming line appears, means associated with each said group of testing relays operating through said common switching means for identifying the group of switches in which said outgoing line appears, said switches in each said group being arranged in subgroups, subgroup relays associated with a last of said subgroups, said subgroup relays in said groups of switches in said first section of said plurality of groups of switches herein called group relays being responsive to the identity of a switch in a first of said subgroups in which an incoming line to be extended appears, relays herein called gate relays associated with each first of said subgroups in said last section of said plurality of groups being responsive to said identifying means, said subgroup relays in said groups of switches in said last section of said plurality of groups of switches herein called channel relays being jointly controlled by said group relays and said gate relays, means controlled by said group and gate relays for establishing a plurality of equivalent switch controlling connections, means controlled by said channel relays for completing a preferred one of said switch controlling connections, and means automatically responsive thereto for operating said switches.

8. In a switching system a plurality of groups of switches arranged for extending an incoming line to an outgoing line, said plurality of groups being divided into a plurality of sections, incoming lines appearing in switches of a first section of said plurality of groups, outgoing lines appearing in switches of a last section of said plurality of groups, a plurality of route relays associated with said incoming lines for marking for connection with one of said incoming lines a selected one or one of a group of equivalent outgoing lines, groups of outgoing line test relays associated with said outgoing lines, common switching means for connecting to a particular group of said testing relays under control of said route relays, means for identifying the group of switches in which said incoming line appears, means associated with each said group of testing relays operating through said common switching means for identifying the group of switches in which said outgoing line appears, said switches in each said group being arranged in subgroups, subgroup relays associated with a last of said subgroups, said subgroup relays in said groups of switches in said first section of said plurality of groups of switches herein called group relays being responsive to the identity of a switch in a first of said subgroups in which an incoming line to be extended appears, relays herein called gate relays associated with each first of said subgroups in said last section of said plurality of groups being responsive to said identifying means, said subgroup relays in said groups of switches in said last section of said plurality of groups of switches herein called channel relays being jointly controlled by said groups relays and said gate relays, means controlled by said route relays for connecting said identifying means to said gate relays, means controlled by said group, said gate and said channel relays for establishing a preferred switch controlling connection for operating said switches to establish a connection from said incoming line to said selected outgoing line, means responsive to the establishment of said switch controlling connections for causing the automatic and sequential operation of a switch in each subgroup of switches and for releasing all common controlling connections involved in the establishment of said switch controlling connection.

RALPH E. HERSEY.